(12) United States Patent
Liao

(10) Patent No.: US 6,557,444 B1
(45) Date of Patent: May 6, 2003

(54) WOOD LATHE WITH A STEPLESS SPEED-ADJUSTING UNIT FOR A WORKPIECE

(76) Inventor: Juei-Seng Liao, No. 295, Sec. 1, Nanking E. Rd., Taichung City (TW)

( * ) Notice: Subject to any disclaimer, the term of this patent is extended or adjusted under 35 U.S.C. 154(b) by 0 days.

(21) Appl. No.: 10/090,384

(22) Filed: Mar. 4, 2002

(30) Foreign Application Priority Data

Nov. 22, 2001 (TW) .......................................... 090220197

(51) Int. Cl.⁷ .......................... B23B 3/04; B23B 19/00; B27C 7/02; F16H 9/06
(52) U.S. Cl. ............................. 82/117; 82/142; 82/143; 142/1; 474/40; 474/86; 474/88
(58) Field of Search ........................ 82/117, 142, 143; 142/1, 3–5, 17; 144/46, 48.3; 29/27 R, 27 A; 474/37, 39, 40–42, 86, 88

(56) References Cited

U.S. PATENT DOCUMENTS

| | | | | |
|---|---|---|---|---|
| 2,024,460 A | * | 12/1935 | Lewellen et al. ............. | 474/40 |
| 2,096,431 A | * | 10/1937 | Keller .......................... | 474/40 |
| 2,517,608 A | * | 8/1950 | Taylor ......................... | 29/27 R |
| 3,410,326 A | * | 11/1968 | Paquin .......................... | 142/1 |
| 3,418,863 A | * | 12/1968 | Landau .......................... | 474/40 |
| 3,705,517 A | * | 12/1972 | Yamanaka et al. ............ | 474/40 |
| 5,186,088 A | * | 2/1993 | Wixey .......................... | 82/142 |

* cited by examiner

Primary Examiner—Steven C. Bishop
(74) Attorney, Agent, or Firm—Knobbe Martens Olson & Bear LLP

(57) ABSTRACT

A wood lathe includes a driving pulley unit disposed around a rotating inner rod, a driven pulley unit disposed around an output shaft that is used to rotate a workpiece, a V-belt unit trained on the driving and driven pulley units, and a speed-adjusting unit. When a rotary knob is rotated, amovable inner half of the driven pulley unit moves toward or away from a fixed outer half of the driven pulley unit so that the V-belt unit moves a movable outer half of the driving pulley unit away from or toward a fixed inner half of the driving pulley unit. As such, the position of the V-belt unit can be adjusted relative to the driving and driven pulley units to change the rotational speed of the output shaft.

3 Claims, 15 Drawing Sheets

WOOD LATHE WITH A STEPLESS SPEED-ADJUSTING UNIT FOR A WORKPIECE

CROSS REFERENCE TO RELATED APPLICATION

This application claims priority of Taiwanese Application No. 90220197, filed on Nov. 22, 2001.

BACKGROUND OF THE INVENTION

1. Field of the Invention

This invention relates to a wood lathe, and more particularly to a wood lathe, which includes a stepless speed-adjusting unit that is operable to adjust the rotational speed of a workpiece.

2. Description of the Related Art

Referring to FIGS. 1 and 2, a conventional wood lathe 10 is shown to include a table 11, a fixed seat 12, a coupling rod 13, a workpiece-holding unit 14, a blade unit 15, and a driving unit 16. The table 11 has a first end 111 and a second end 112. The fixed seat 12 includes a right housing 121, a partition 122, and a left housing 123. The partition 122 is disposed between and is connected removably to the right and left housings 121, 123. The coupling rod 13 is disposed fixedly on the table 11, and has a first end 131 that extends through a bushing 1212 on the right housing 121 of the fixed seat 12, and a second end 132. The workpiece-holding unit 14 includes an output shaft 141 that extends through a bearing 1211 on the right housing 121, a left clamping element 142 that is bolted to the output shaft 141, a sliding member 143 that is sleeved movably and that is locked releaseably on the second end 132 of the coupling rod 13, and a right clamping element 144 that is mounted rotatably on the sliding member 143. The left and right clamping elements 141, 144 press respectively against two end surfaces 172, 171 of an elongated wood workpiece 17 so as to clamp the workpiece 17 between the left and right clamping elements 141, 144, thereby permitting synchronous rotation of the workpiece 17 and the output shaft 141. The driving device 16 includes a motor 161 that is disposed between the left housing 123 and the partition 122, a stepped driving wheel 162 that is sleeved fixedly on a motor shaft of the motor 161, a stepped driven wheel 163 that is sleeved fixedly on the output shaft 141, and an endless driving belt 164 that is trained on the driving wheel 162 and the driven wheel 163.

When it is desired to change the rotational speed of the output shaft 141 and the workpiece 17, the left housing 123 is removed from the partition 122 and the right housing 121 so that the position of the belt 164 can be adjusted relative to the driving wheel 162 and the driven wheel 163. Subsequently, the left housing 123 is mounted back onto the partition 122 and the right housing 121. As such, it is time-consuming to adjust the rotational speed of the workpiece 17. Furthermore, the lathe 10 cannot be used to rotate a second workpiece that is shaped as a ring plate.

SUMMARY OF THE INVENTION

An object of this invention is to provide a wood lathe, which includes a stepless speed-adjusting unit that can be adjusted with relative ease to change the rotational speed of a workpiece.

Another object of this invention is to provide a wood lathe, which can be used to rotate a workpiece that is shaped as a ring plate.

According to this invention, a wood lathe has a driving device, which includes a driving pulley unit disposed around a rotating inner rod, a driven pulley unit disposed around a first output shaft, a V-belt unit trained on the driving and driven pulley units, and a speed-adjusting unit. The first output shaft is used to rotate a first workpiece that is shaped as a straight rod. When a rotary knob is rotated, a movable inner half of the driven pulley unit moves toward or away from a fixed outer half of the driven pulley unit so that the V-belt unit moves a movable outer half of the driving pulley unit away from or toward a fixed inner half of the driving pulley unit. As such, the position of the V-belt unit can be adjusted relative to the driving and driven pulley units to change the rotational speed of the first output shaft.

Preferably, the lathe further has a workpiece-holding unit that includes:

a bearing tube member disposed fixedly on a table;

a second output shaft parallel to the first output shaft and having an externally threaded first end with a reduced outer diameter to define a shoulder, and a second end, the second output shaft being journalled within the bearing tube member and being adapted to extend through a second workpiece that is shaped as a ring plate;

a driving gear sleeved fixedly on the first output shaft;

a driven gear sleeved fixedly on the second end of the second output shaft;

a toothed endless belt trained on the driving and driven gears so as to transfer rotation of the first output shaft to the second output shaft; and a nut engaging threadably the first end of the second output shaft so as to be adapted to lock the second workpiece between the nut and the shoulder of the second output shaft.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
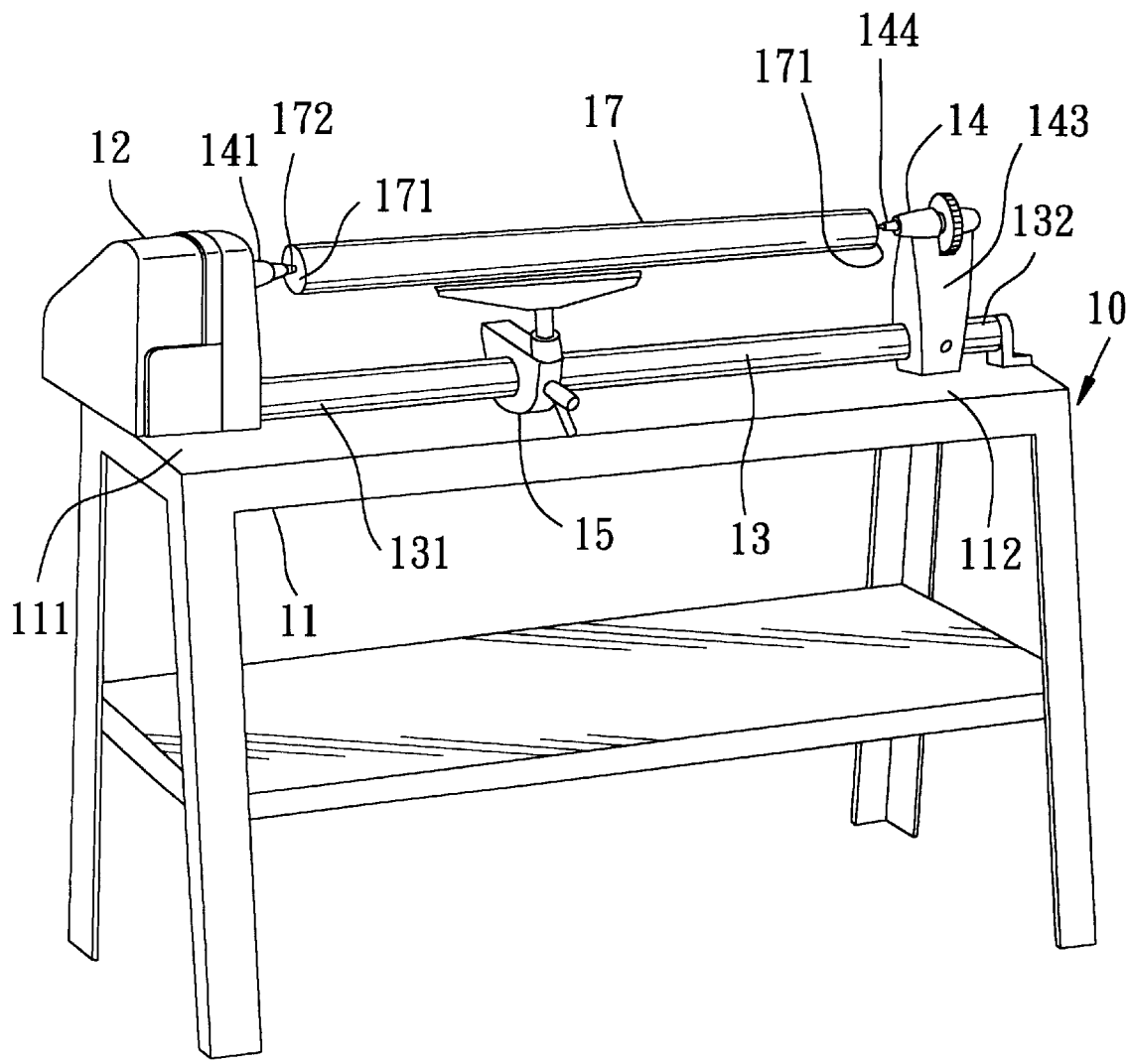
FIG. 1 is a perspective view of a conventional wood lathe.
Figure 2:
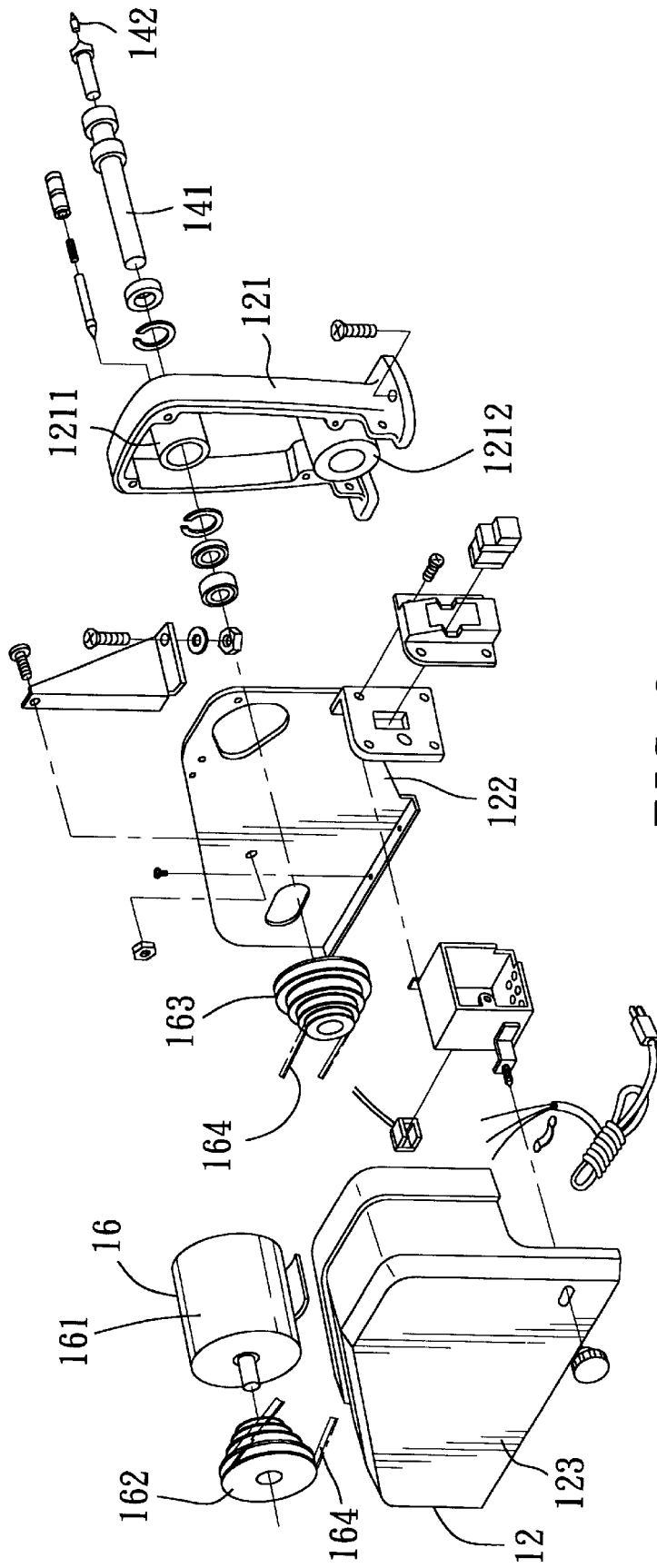
FIG. 2 is a fragmentary exploded perspective view of the conventional wood lathe.
Figure 3:
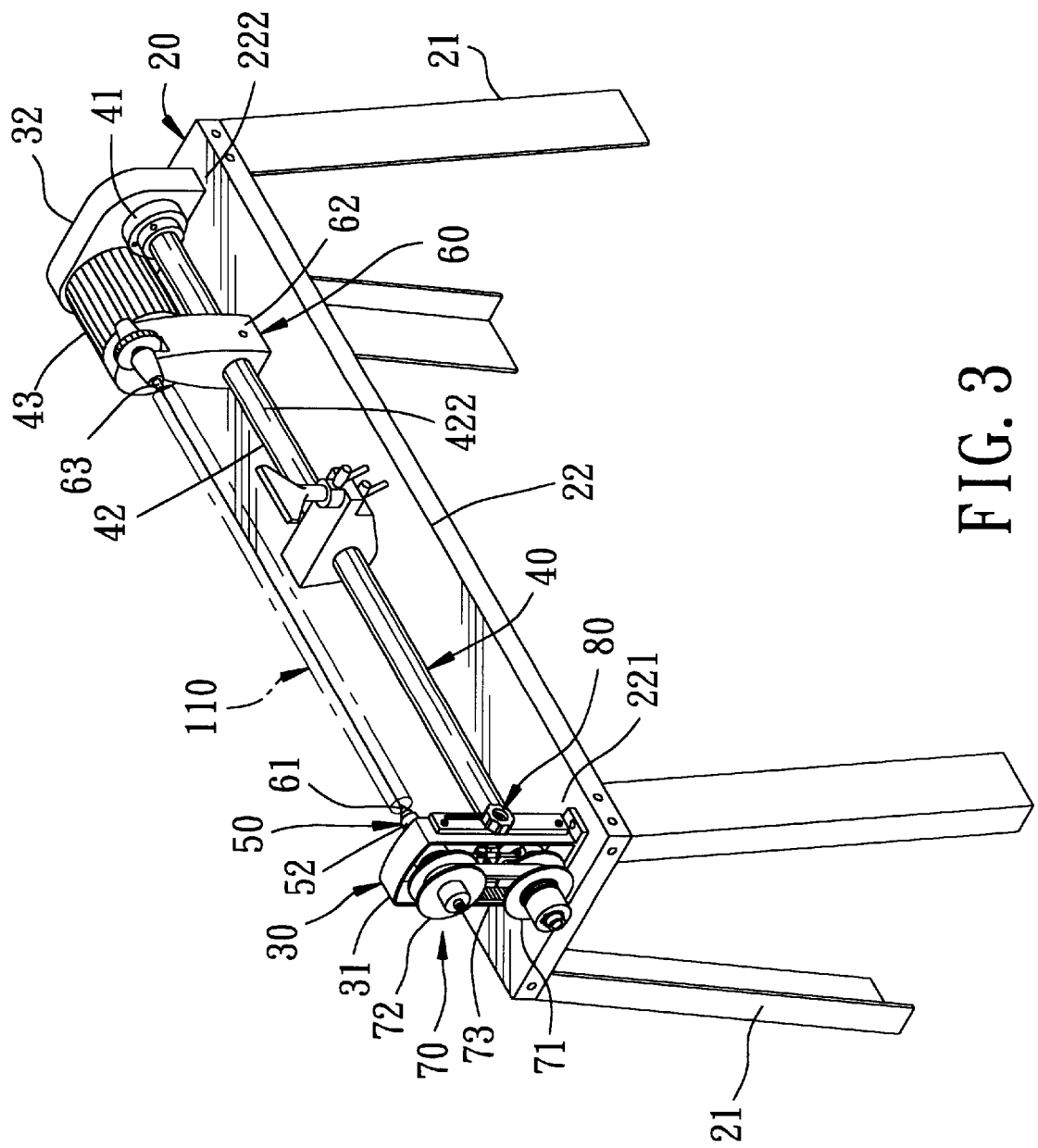
FIG. 3 is an assembled perspective view of a first preferred embodiment of a wood lathe according to this invention, illustrating how a first workpiece is held on a first workpiece-holding unit.

Referring to FIG. 3, a first preferred embodiment of a wood lathe according to this invention is shown to include a table 20, a fixed seat unit 30, a first driving device 40, an output shaft 50, a first workpiece-holding unit 60, and a second driving device 70.

The table 20 has four legs 21 and an elongated horizontal table top 22.

The fixed seat unit 30 includes a first seat 31 and a second seat 32 that are fixed respectively on first and second ends 221, 222 of the table top 22.

Figure 6:
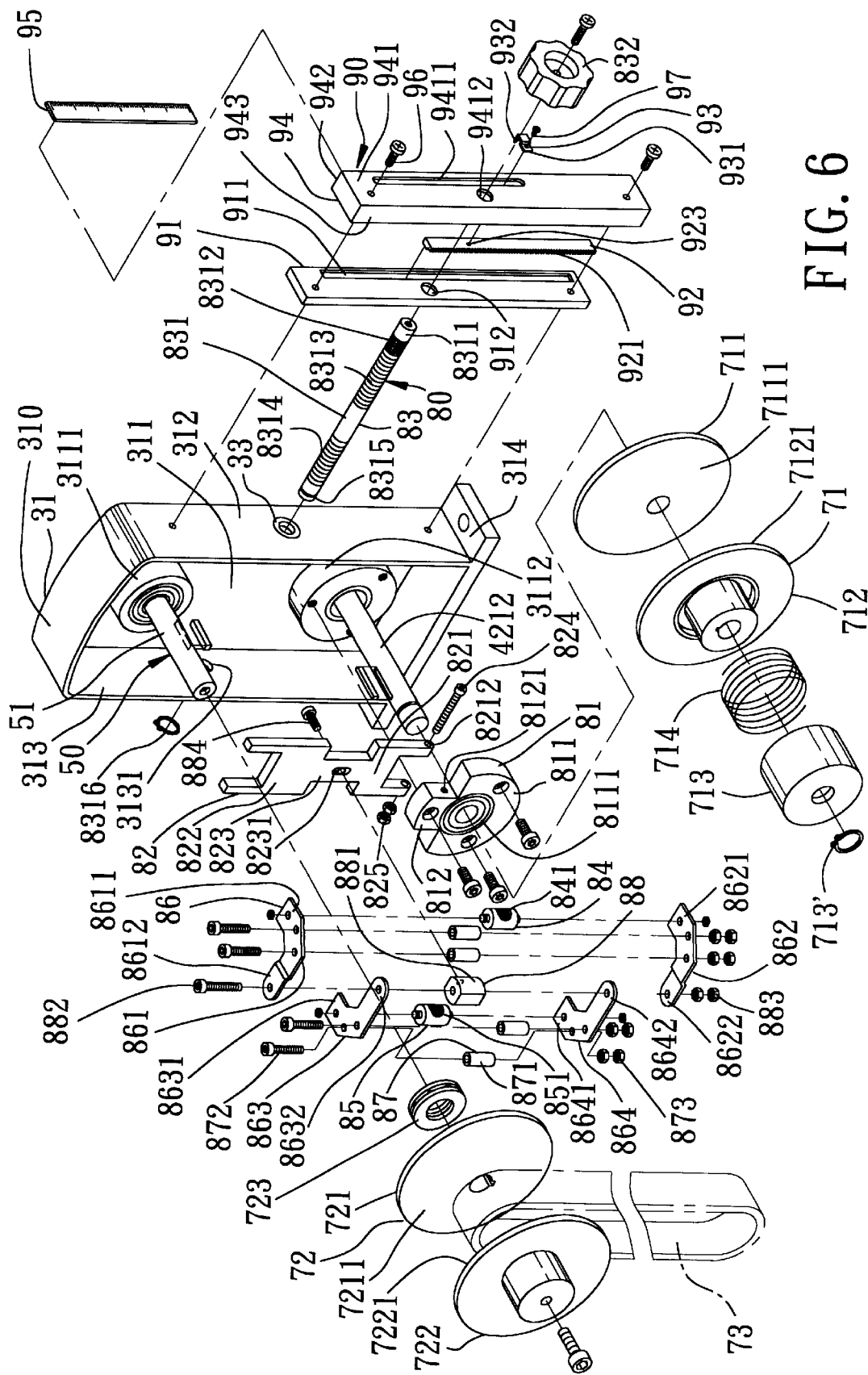
FIG. 6 is an exploded perspective view illustrating the second driving device, the speed-adjusting unit, and an indicator unit of the first preferred embodiment.

Referring to FIG. 6, the first seat 31 has a hollow housing, which includes a top wall 310, a right side wall 311, a front side wall 312, a rear side wall 313, and a bottom wall 314 that is bolted onto the table top 22. The right side wall 311 is provided with a top bearing unit 3111 and a bottom bearing unit 3112. A bushing 33 extends through and is fixed on the front side wall 312. The rear side wall 313 is formed with a hole 3131 that is aligned with the bushing 33.

Figure 4:
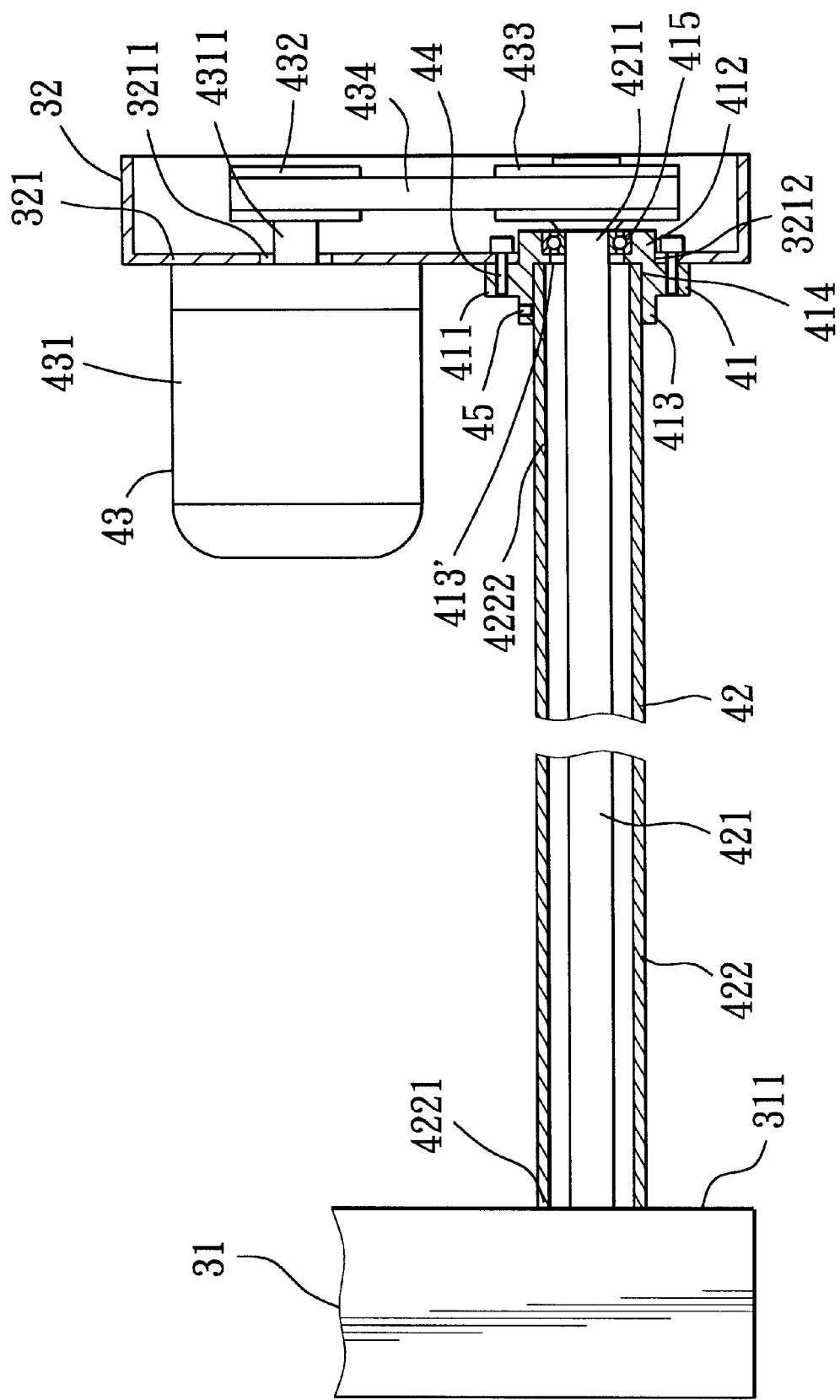
FIG. 4 is a partly sectional fragmentary top view of the first preferred embodiment, showing a first driving device.

Referring to FIGS. 3 and 4, the second seat 32 also has a hollow housing, which includes a left side wall 321 and a bottom wall that is bolted onto the table top 22. The left side wall 321 is formed with a hole 3212 that is aligned with the bottom bearing unit 3112 (see FIG. 6) of the first seat 31.

Figure 7:
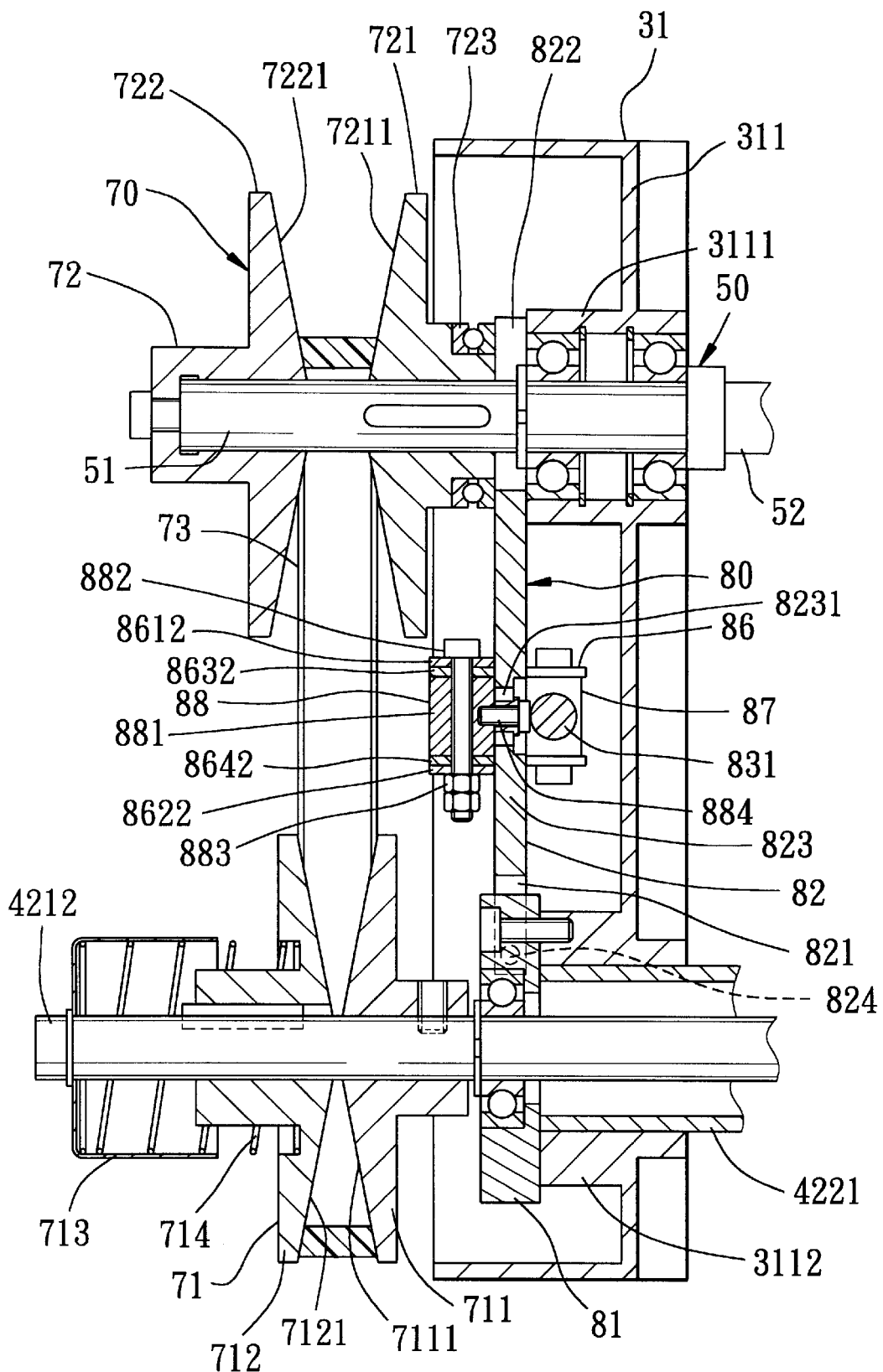
FIG. 7 is a fragmentary sectional view of the first preferred embodiment, showing the second driving device when disposed at a first position so that a first output shaft can rotate at a maximum speed.

Referring to FIGS. 3, 4, and 7, the first driving device 40 includes a bearing unit 41 that is disposed within the hole 3212 in the second seat 32, a constant-speed rotating unit 42, and a driving source assembly 43.

The bearing unit 41 includes a tubular body, which has an outward flange 411 that is fixed to the left side wall 321 of the second seat 32 by bolts 44, a right end 412 that is inserted into the hole 3212 in the second seat 32, a left end 413, an inward flange 413', and a central hole 414. A bearing 415 is disposed within the right end 412.

The constant-speed rotating unit 42 includes a rotating inner rod 421 that is journalled between the first and second seats 31, 32, and a fixed outer tube 422 that is disposed around the rotating inner rod 421 and that is fixed between the first and second seats 31, 32. The rotating inner rod 421 has a first end 4212 that extends through and that projects outwardly from the bottom bearing unit 3112 of the first seat 31, and a second end 4211 that extends through and that projects outwardly from the bearing unit 41 disposed within the second seat 32. The outer tube 422 has a first end 4221 that extends into and that is fixed to the first seat 31, and a second end 4222 that extends into and that is fixed to the bearing unit 41 by a lock bolt 45.

The driving source assembly 43 includes a motor 431, a driving pulley 432, a driven pulley 433, and a V-belt 434. The motor 431 is disposed on the left side wall 321 of the second seat 32, and is provided with a motor shaft 4311 that extends from a hole 3211 in the left side wall 321. The driving pulley 432 is sleeved fixedly on the motor shaft 4311. The driven pulley 433 is sleeved fixedly on the second end 4211 of the rotating inner rod 421. The V-belt 434 is trained on the driving and driven pulleys 432, 433 so as to transfer rotation of the motor shaft 4311 to the rotating inner rod 421 in such a manner that the rotating inner rod 421 rotates at a speed slower than that of the motor shaft 4311.

Referring to FIGS. 3, 6, and 7, the first output shaft 50 is journalled on the top bearing unit 3111 of the first seat 31, is parallel to the rotating inner rod 421, and has a first end 51 that is disposed over the first end 4212 of the rotating inner rod 421, and a second end 52 that projects outwardly from the first seat 31 and that is disposed between the first and second seats 31, 32.

The first workpiece-holding unit 60 includes a first clamping element 61 that is connected fixedly to the second end 52 of the first output shaft 50, a sliding member 62 that is sleeved movably and that is locked releaseably on the outer tube 422, and a second clamping element 63 that is mounted rotatably on the sliding element 62 in a known manner. As such, a wood workpiece 110 in the form of a straight rod can be clamped between the first and second clamping elements 61, 63 in a known manner, thereby permitting synchronous rotation of the workpiece 110 with the first output shaft 50.

The second driving device 70 is disposed between the first end 4212 of the rotating inner rod 421 and the first end 51 of the first output shaft 50 so as to transfer rotation of the rotating inner rod 421 to the first output shaft 50.

Figure 5:
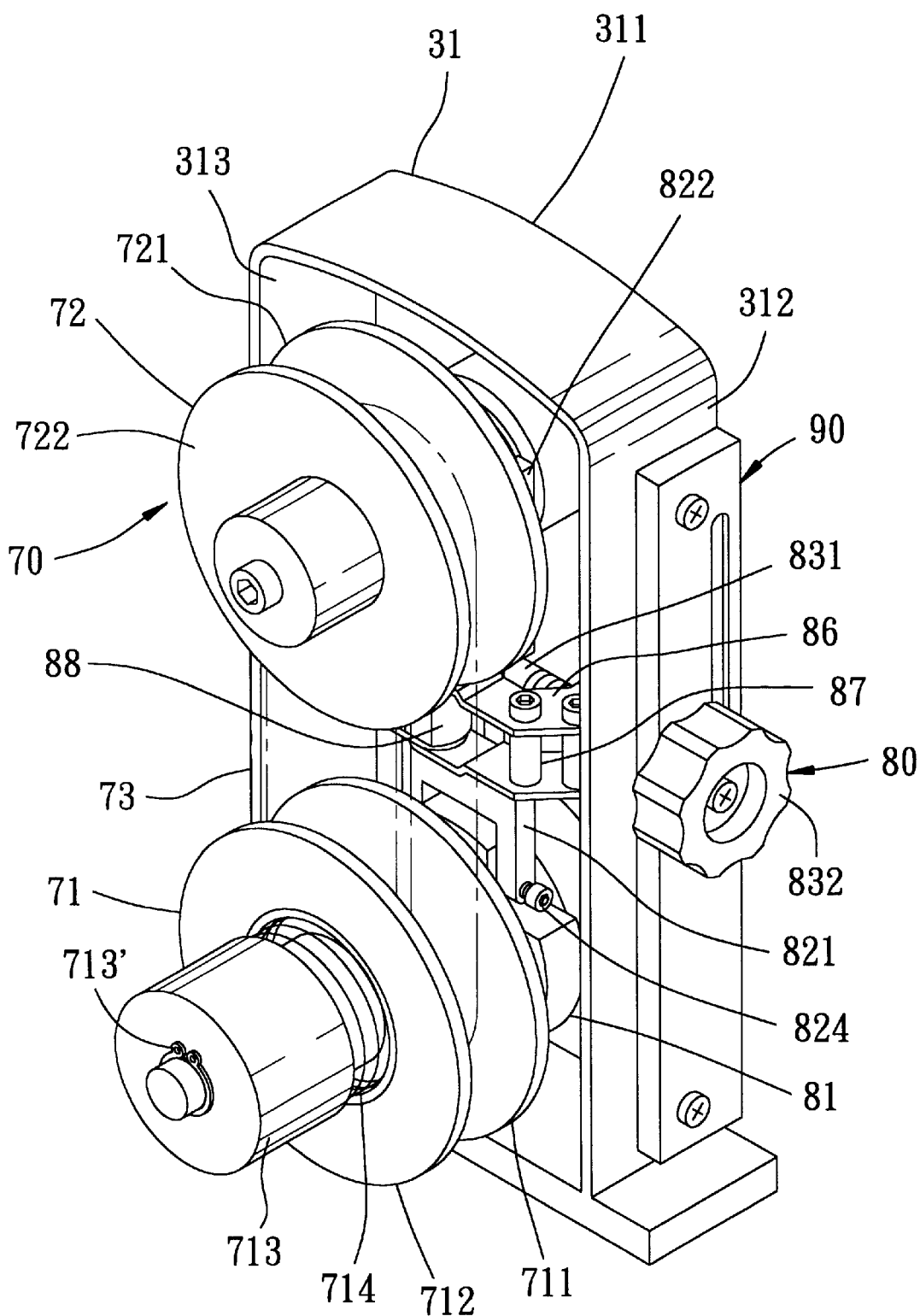
FIG. 5 is an assembled fragmentary perspective view of the first preferred embodiment, illustrating how a second driving device and a speed-adjusting unit are disposed on a first seat.

Referring to FIGS. 5, 6, and 7, the second driving device 70 includes a driving pulley unit 71 that is disposed around the rotating inner rod 421, a driven pulley unit 72 that is disposed around the first output shaft 50, and a V-belt unit 73 that is trained on the driving and driven pulley units 71, 72.

The driving pulley unit 71 includes a fixed inner half 711 that is sleeved on the first end 4212 of the rotating inner rod 421, a movable outer half 712 that is sleeved movably on the first end 4212 in such a manner that the fixed inner half 711 is located between the movable outer half 712 and the first seat 31, an annular positioning cap 713 that is sleeved and retained on the first end 4212 by a C-shaped retaining ring 713', and a coiled compression spring 714 that is disposed between the cap 713 and the movable outer half 712 so as to press the cap 713 against the C-shaped retaining ring 713' and so as to bias the movable outer half 712 toward the fixed inner half 711. The fixed inner half 711 and the movable outer half 712 are formed respectively with two inclined belt-engaging surfaces 7111, 7121 that define a trapezoidalcross-sectioned groove for engaging the V-belt unit 73. The driven pulley unit 72 includes a movable inner half 721 that is sleeved movably on the first end 51 of the first output shaft 50, a fixed outer half 722 that is sleeved fixedly on the first end 51 in such a manner that the movable inner half 721 is located between the fixed outer half 722 and the first seat 31, and a thrust bearing 723 that is disposed around a right end of the movable inner half 721. The movable inner half 721 and the fixed outer half 722 are also formed respectively with two inclined belt-engaging surfaces 7211, 7221 that define a trapezoidal-cross-sectioned groove for engaging the V-belt unit 73.

A stepless speed-adjusting unit 80 is connected to the second driving device 70, and includes a fixed member 81, a push member 82, a horizontal adjustment rod assembly 83, a first driving element 84, a second driving element 85, a link assembly 86, a spacer assembly 87, and a pusher-connecting assembly 88.

The fixed member 81 is bolted onto the right side wall 311 of the first seat 31, and has a semicircular lower portion 811, and a neck 812 that extends integrally and upwardly from a middle portion of a top surface of the lower portion 811. The lower portion 811 is provided with a bearing unit 8111, through which the first end 4212 of the rotating inner rod 421 extends. The neck 812 is formed with a hole 8121.

The push member 82 is unitary, and has an inverted U-shaped lower pivot portion 821, a U-shaped upper pushing portion 822, and a connecting portion 823 that interconnects the pivot portion 821 and the upper pushing portion 822. A pivot bolt 824 extends through two holes 8212 in the pivot portion 821 and the holes 8121 in the neck 812 of the fixed member 81 to engage two adjoining nuts 825 so as to permit rotation of the push member 82 about the pivot bolt 824.

The adjustment rod assembly 83 includes a rod body 831, and a rotary knob 832 that is bolted to an end of the rod body 831. The rod body 831 has a knob-engaging end 8311, a pinion portion 8312, a left-hand screw portion 8313, a right-hand screw portion 8314, and a slotted end 8314. A C-shaped retaining ring 8316 is received within an annular slot in the end 8314 for preventing movement of the rod body 831 relative to the first seat 31.

The first and second driving elements 84, 85 engage respectively and threadably the left-hand and right-hand screw portions 8313, 8314 of the adjustment rod assembly 83.

The link assembly 86 includes a first upper link 861 that is connected pivotally to a top end of the first driving element 84 at a rod-coupling end 8611, a first lower link 862 that is connected pivotally to a bottom end of the first driving element 84 at a rod-coupling end 8621, a second upper link 863 that is connected pivotally to a top end of the second driving element 85 at a rod-coupling end 8631, and a second lower link 864 that is connected pivotally to a bottom end of the second driving element 85 at a rod-coupling end 8641. Each of the first upper link 861, the first lower link 862, the second upper link 863, and the second lower link 864 has a link-coupling end 8612, 8622, 8632, 8642. The link-coupling ends 8612, 8632 of the first and second upper links 861, 863 are connected pivotally to each other. The link-coupling ends 8622, 8642 of the first and second lower links 862, 864 are connected pivotally to each other.

The spacer assembly 87 includes four spacer tubes 871, four bolts 872, and four adjacent pairs of nuts 873. Two of the spacer tubes 871 are disposed between the first upper and lower links 861, 862, while another two of the spacer tubes 871 are disposed between the second upper and lower links 863, 864 so that the first and second upper links 861, 863 are spaced apart from the first and second lower links 862, 864 at a predetermined distance. The bolts 872 extend through four holes in the first and second upper links 861, 863, the spacer tubes 871, and four holes in the first and second lower links 862, 864 to engage the nuts 873, thereby retaining the spacer tubes 871 on the first and second upper links 861, 863 and the first and second lower links 862, 864.

The pusher-connecting assembly 88 includes a connecting tube 881, a bolt 882, two adjoining nuts 883, and a bolt 884. The connecting tube 881 is disposed between the second upper and lower links 863, 864. The bolt 882 extends through two holes in the first and second upper links 861, 863, the connecting tube 881, and two holes in the first and second lower links 862, 864 to engage two adjoining nuts 883. The bolt 884 extends through a hole 8231 in the push member 82 to engage a threaded hole in the connecting tube 881 so as to swing the push member 82 when the connecting tube 881 moves relative to the first seat 31.

The indicator unit 90 includes a vertical mounting strip 91, a rack 92, an indicator 93, a front cover 94, and a scale 95.

Figure 13:
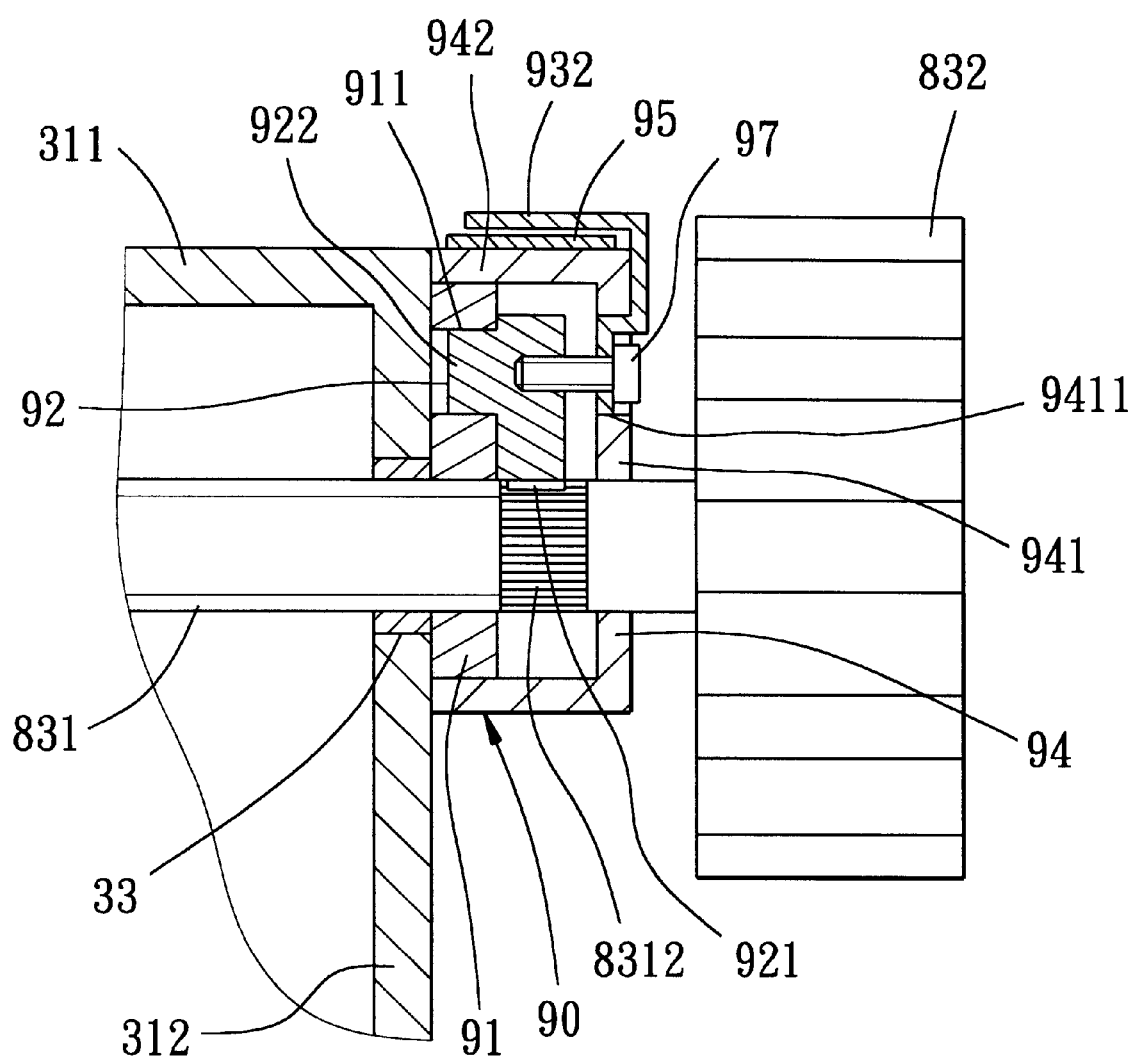
FIG. 13 is a partly sectional fragmentary side view of the first preferred embodiment, illustrating how the indicator unit is mounted on the first seat.

Referring to FIGS. 6 and 13, the mounting strip 91 and the front cover 94 are connected fixedly to the front side wall 312 of the first seat 31 by two bolts 96, and are formed respectively with two holes 912, 9412 for extension of the rod body 831. The mounting strip 91 is formed with a vertical slide slot 911. The rack 92 is unitary, and has a toothed portion 921 that meshes with the pinion portion 8312 of the rod body 831 of the adjustment rod assembly 83, and a sliding element 922 that is received slidably within the slide slot 911 in the mounting strip 91. As such, when the adjustment rod assembly 83 rotates, the rack 92 moves along the slide slot 911.

The front cover 94 has a front side wall 941 with a vertical slide slot 9411, a right side wall 942, and a left side wall 943.

The indicator 93 is unitary, and has a sliding body 931 that is connected fixedly to the rack 92 by a bolt 97 and that is received slidably within the slide slot 9411 in the front cover 94, and a pointer 932 that projects outwardly from the vertical slide slot 9411 and that is bent to abut against the right side wall 942 of the front cover 94.

The scale 95 is fixed to the right side wall 942 of the front cover 95. The pointer 932 is directed to the scale 95.

Because the rack 92 meshes with the pinion portion 8312 of the adjustment rod assembly 83, when the rotary knob 832 is rotated, the pointer 932 moves vertically relative to the scale 95.

Figure 8:
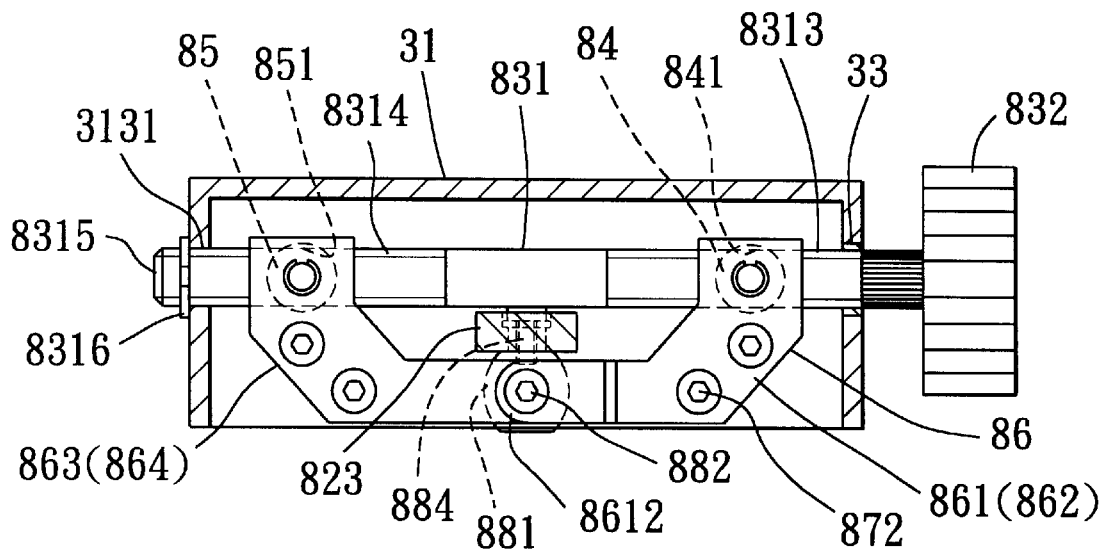
FIG. 8 is a fragmentary sectional top view of the first preferred embodiment, illustrating how the speed-adjusting unit is operated so that the second driving device is disposed at the first position.

Referring to FIGS. 7 and 8, the second driving device 70 is disposed at a first position, where the push member 82 is vertical, where the movable outer half 712 of the driving pulley unit 71 is disposed at its rightmost position, and where the movable inner half 721 of the driven pulley unit 72 is disposed at its rightmost position. As such, the V-belt unit 73 engages a radial outer end of the driving pulley unit 71 and a radial inner end of the driven pulley unit 72 so that the driven pulley 72 and the first output shaft 50 can rotate at a maximum speed.

Figure 10:
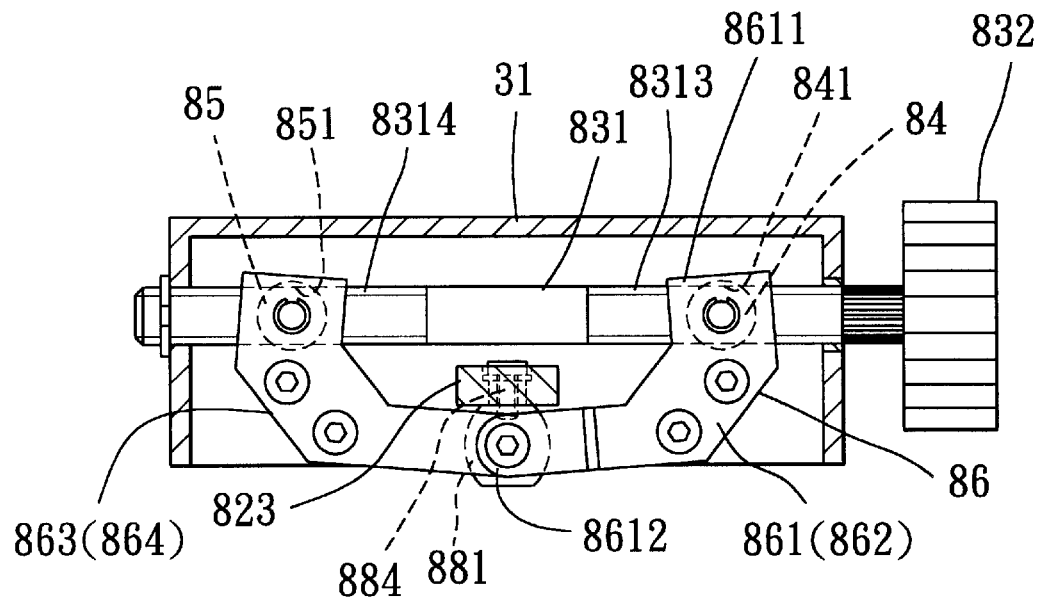
FIG. 10 is a fragmentary sectional top view of the first preferred embodiment, illustrating how the speed-adjusting unit is operated so that the second driving device is disposed at the second position, thereby rotating the first output shaft and the rotating inner rod at the same speed.
Figure 9:
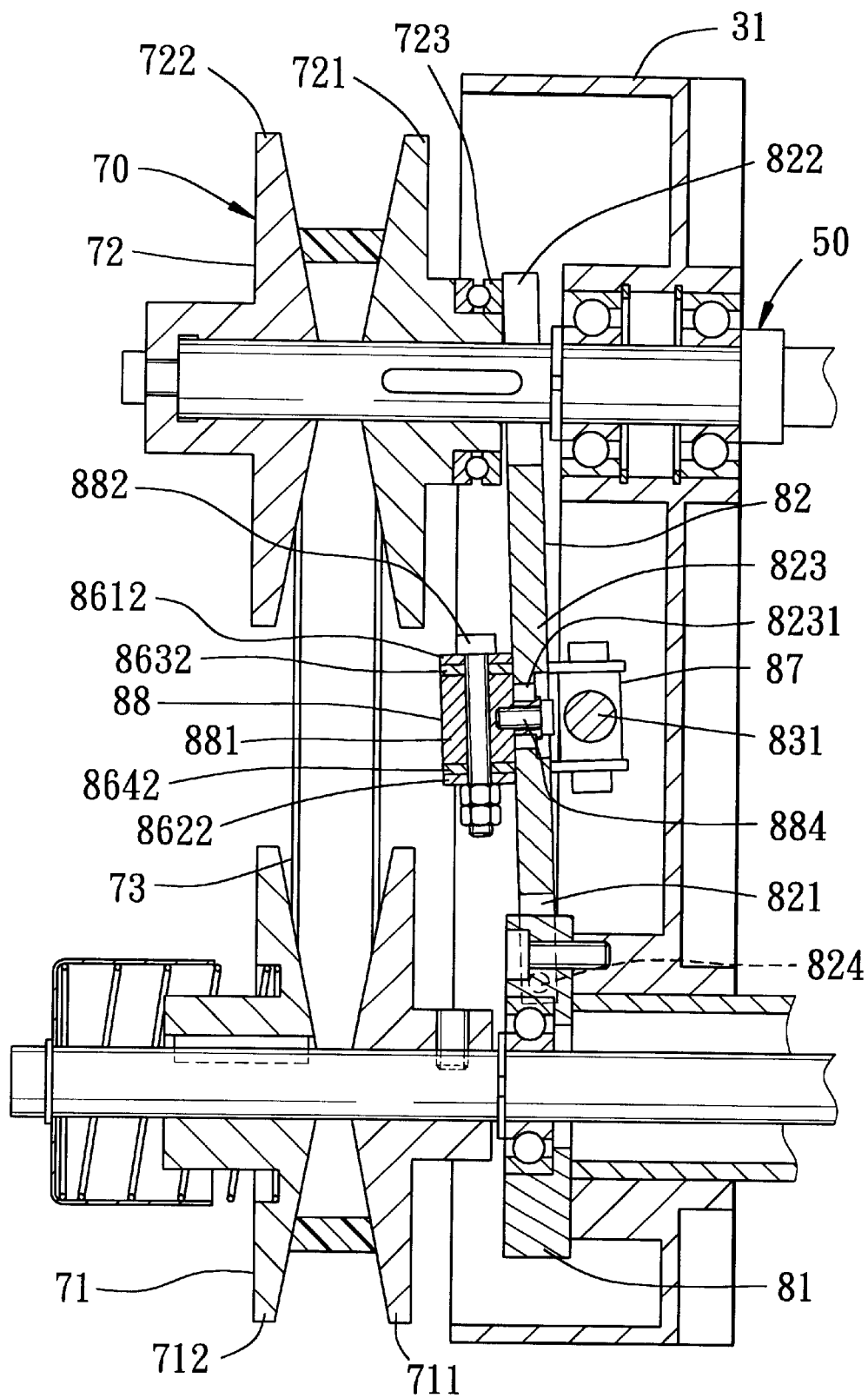
FIG. 9 is a fragmentary sectional view of the first preferred embodiment, showing the second driving device when disposed at a second position so as to slow down the rotational speed of the first output shaft.

Referring to FIGS. 6, 9, and 10, when it is desired to slow down the rotational speed of the first output shaft 50, the rotary knob 832 is rotated in a predetermined direction so as to move the first and second driving elements 84, 85 toward each other from the position shown in FIG. 8 to that shown in FIG. 10, where the first upper and lower links 861, 862 rotate counterclockwise about the bolt 882 and where the second upper and lower links 863, 864 rotate clockwise about the bolt 882 so as to move the connecting tube 881 and the bolt 884 to the left, thereby rotating the push member 82 counterclockwise about the pivot bolt 824. The upper pushing portion 882 of the push member 82 moves the movable inner half 721 of the driven pulley unit 72 to the left from the position shown in FIG. 7 to that shown in FIG. 9, where the V-belt unit 73 moves radially and outwardly on the driven pulley unit 72 to a middle position so as to move the movable outer half 71 to the left against the biasing action of the spring 714, thereby disposing the second driving device 70 at a second position so as to rotate the driven pulley unit 72 and the first output shaft 50 at the same speed as that of the driving pulley unit 71.

Figure 11:
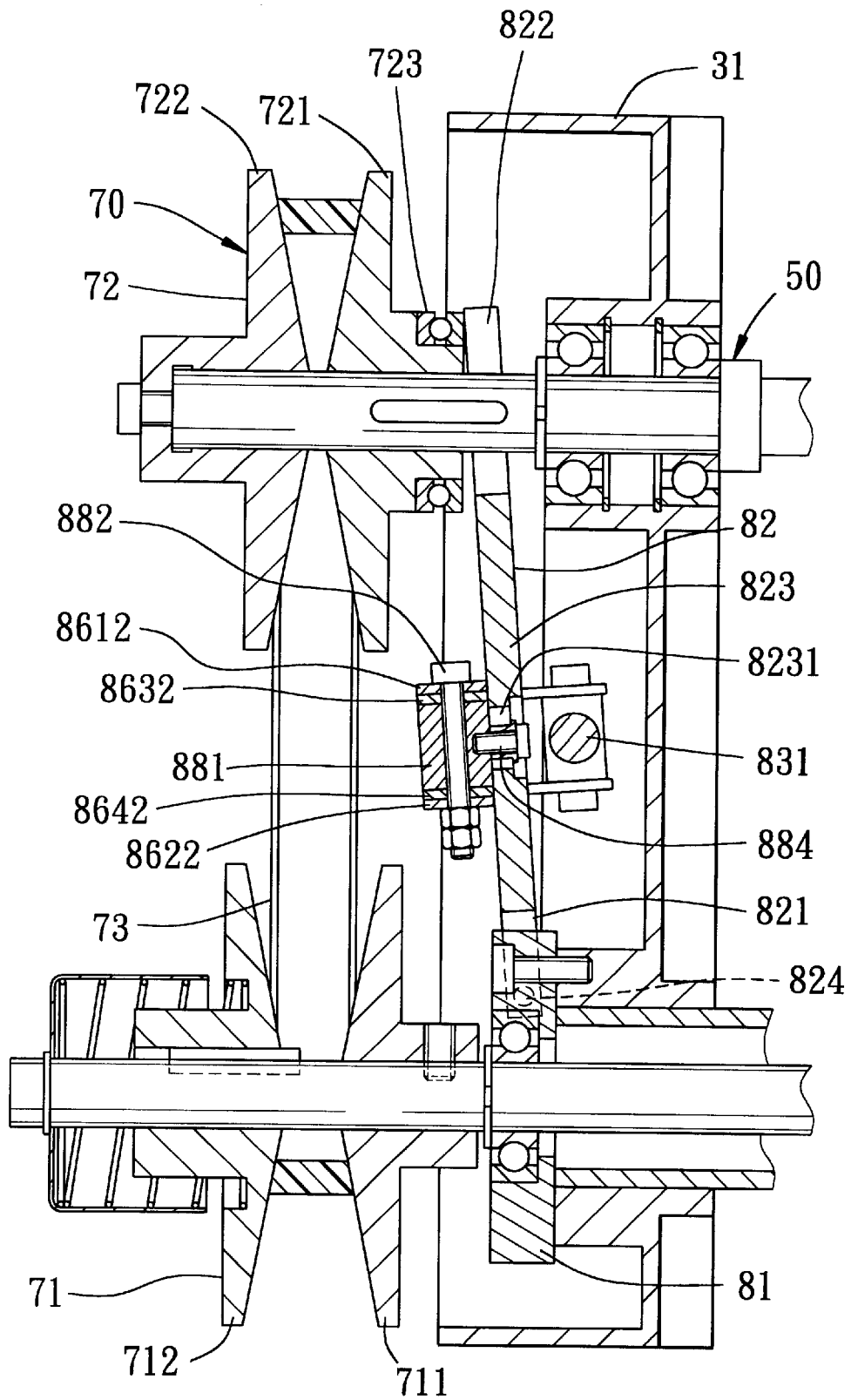
FIG. 11 is a fragmentary sectional view of the first preferred embodiment, showing the second driving device when disposed at a third position so as to further slow down the rotational speed of the first output shaft, thereby rotating the first output shaft at a minimum speed.
Figure 12:
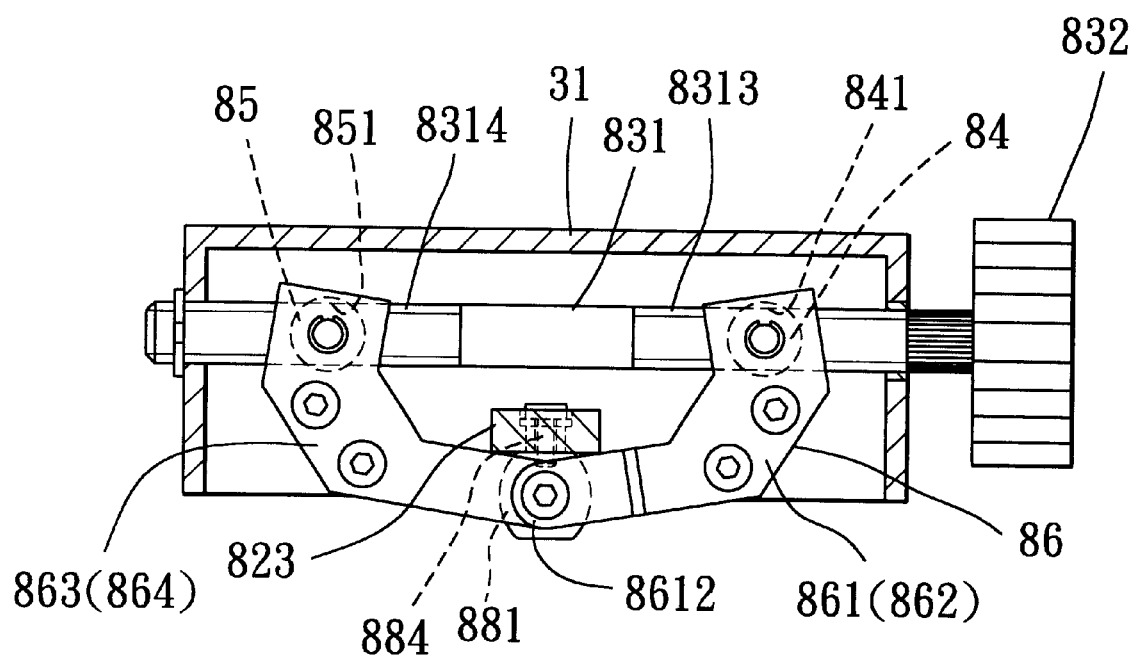
FIG. 12 is a fragmentary sectional top view of the first preferred embodiment, illustrating how the speed-adjusting unit is operated so that the second driving device is disposed at the third position.

Referring to FIGS. 11 and 12, when the rotary knob 832 is further rotated in the predetermined direction, the upper pushing portion 822 of the push member 82 can move the movable inner half 721 to its leftmost position, where the V-belt unit 73 engages a radial outer end of the driven pulley unit 72 so as to move the movable outer half 712 of the driving pulley unit 71 to its leftmost position. As such, the V-belt unit 73 engages a radial inner end of the driving pulley unit 71, thereby disposing the second driving device 70 at a third position so as to rotate the driven pulley unit 72 and the first output shaft 50 at a minimum speed.

The second driving device 70 can be moved from the position shown in FIG. 11 to that shown in FIG. 7 or 9 by rotating the rotary knob 832 in a direction that is opposite to the predetermined direction.

Figure 14:
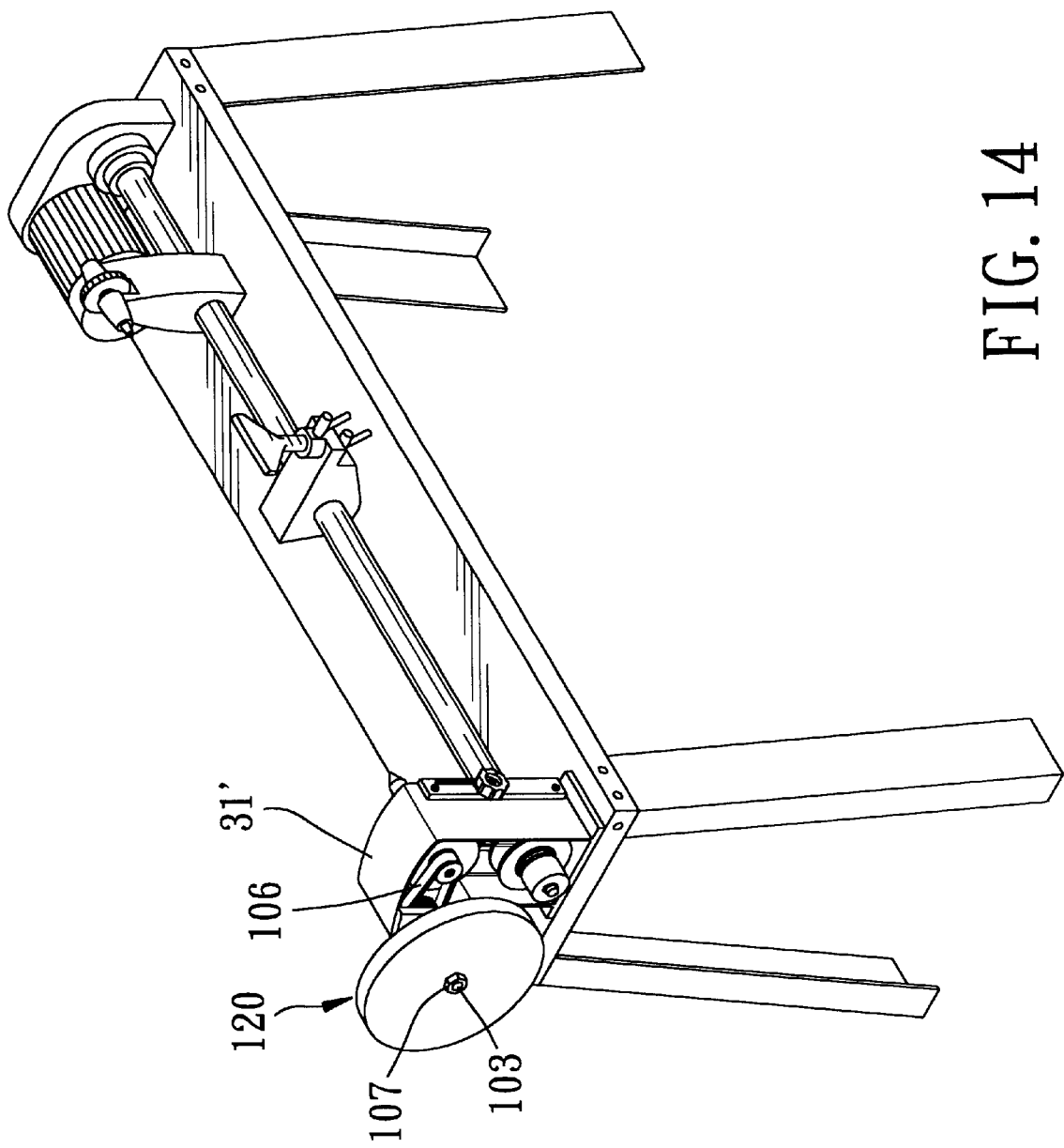
FIG. 14 is an assembled perspective view of a second preferred embodiment of a wood lathe according to this invention.
Figure 15:
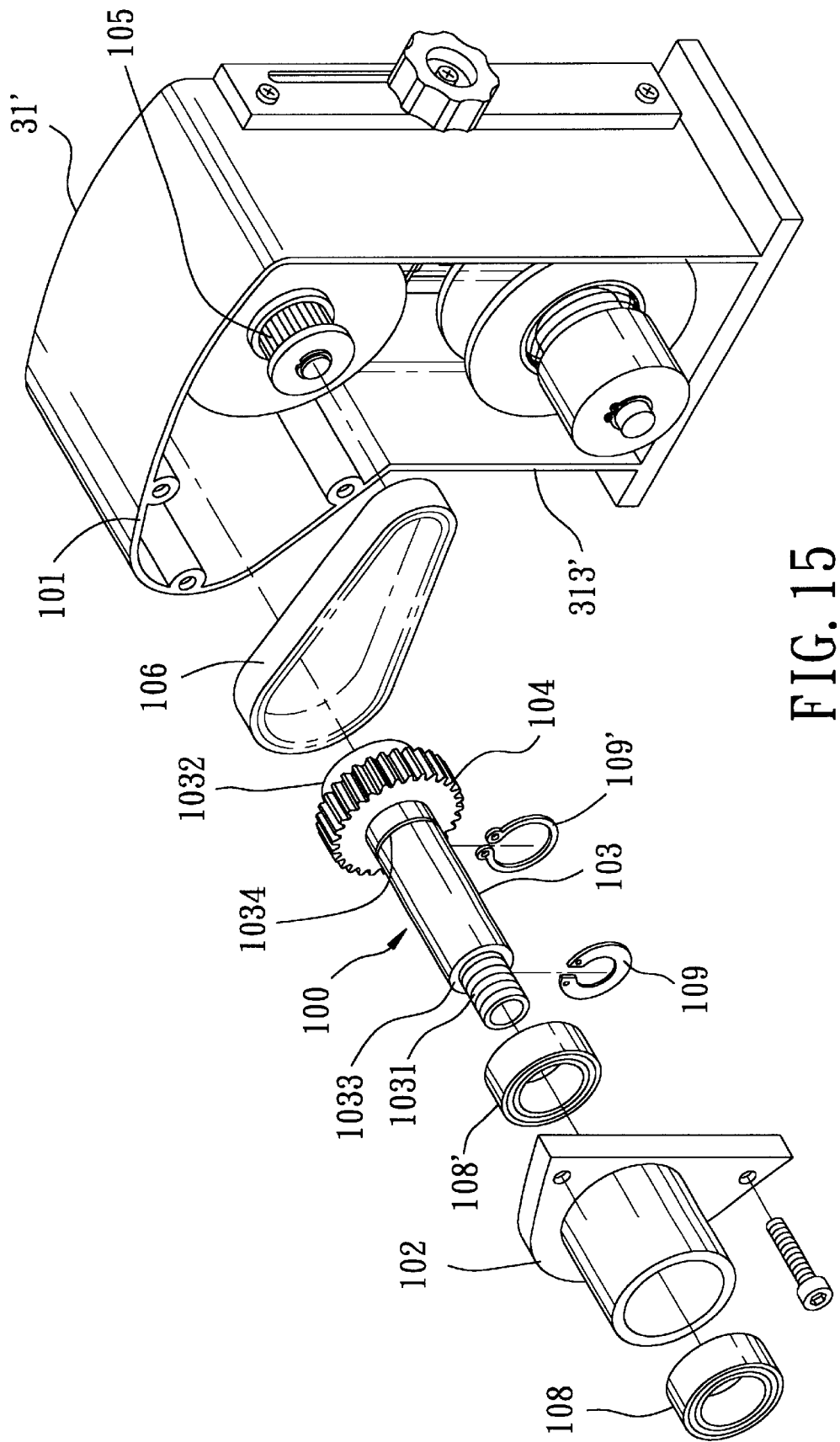
FIG. 15 is a partly exploded fragmentary perspective view of the second preferred embodiment, illustrating a second workpiece-holding unit.
Figure 16:
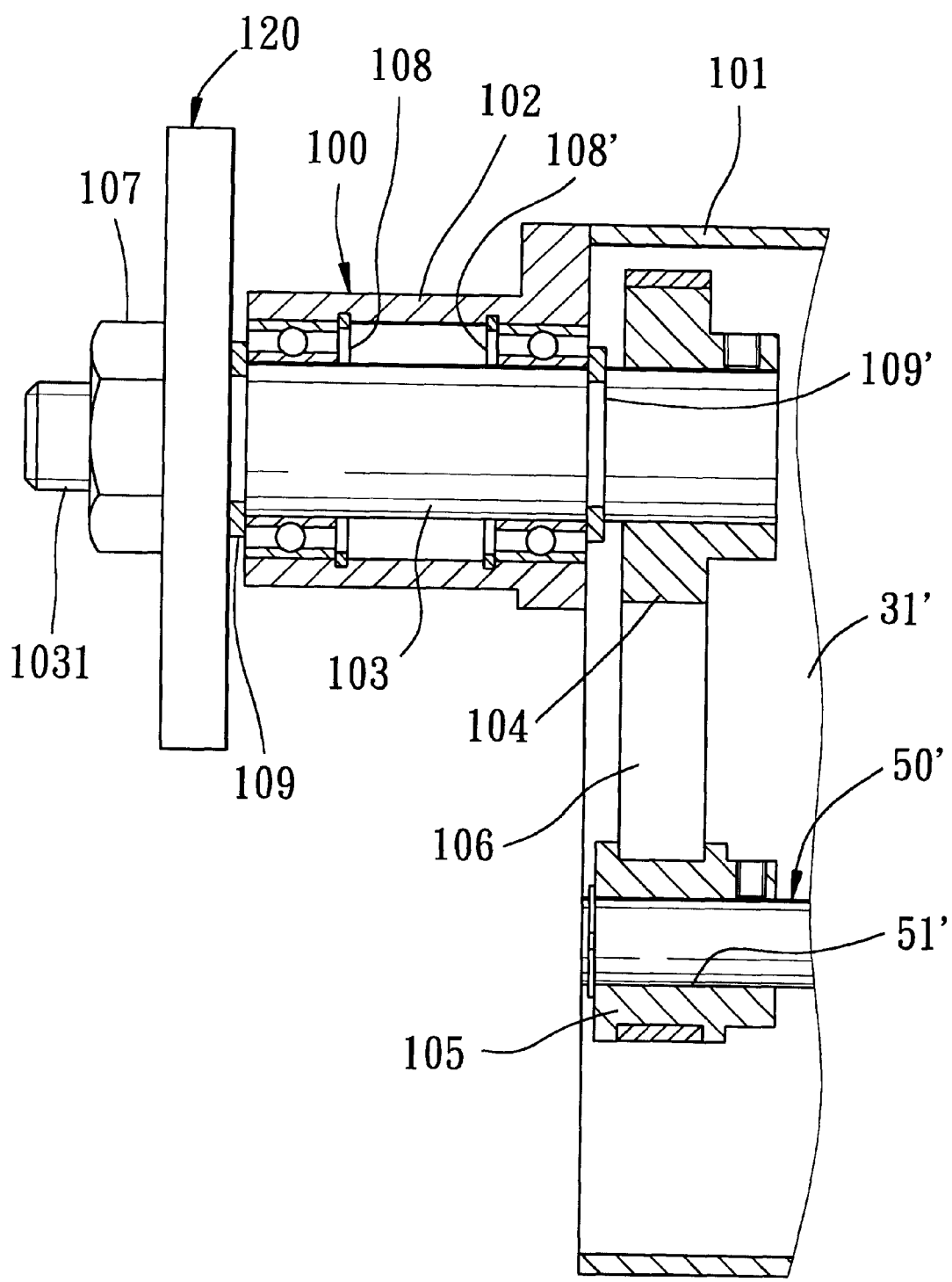
FIG. 16 is a partly sectional, fragmentary top view of the second preferred embodiment, illustrating how a second workpiece is held on the second workpiece-holding unit.

FIGS. 14, 15, and 16 show a second preferred embodiment of this invention, which further has a second workpiece-holding unit 100. Unlike the first embodiment, the first seat 31' has an enlarged upper end portion 101. The second workpiece-holding unit 100 includes a bearing tube member 102, a second output shaft 103, a driven gear 104, a driving gear 105, a toothed endless belt 106, a nut 107 (see FIG. 16), a pair of left and right bearings 108, 108', and a pair of left and right C-shaped retaining rings 109, 109'. The bearing tube member 102 is bolted to a curved upper end portion of the rear side wall 313' of the first seat 31'. The second output shaft 103 is parallel to the first output shaft 50', and has an externally threaded first end 1031 with a reduced outer diameter to define a shoulder 1033, and a second end 1032, on which the driven gear 104 is sleeved fixedly. The driving gear 105 is sleeved fixedly on the first output shaft 50'. The belt 106 is trained on the driven gear 104 and the driving gear 105 so as to transfer rotation of the first output shaft 50' to the second output shaft 103. The nut 107 engages the first end 1031 of the second output shaft 103. The bearings 108, 108' are disposed between the bearing tube member 102 and the second output shaft 103. The left C-shaped retaining ring 109 is sleeved on the first end 1031 of the second output shaft 103, and abuts against the shoulder 1033 of the second output shaft 103 and the left bearing 108 so as to prevent removal of the left bearing 108 from the bearing tube member 102. The right C-shaped retaining ring 108' is received within an annular groove 1034 in the second output shaft 103, and abuts against the right bearing 109' so as to prevent removal of the right bearing 109' from the bearing tube member 102. A second workpiece 120, which is shaped as a ring plate, is sleeved movably on the second output shaft 103, and is clamped between the nut 107 and the left C-shaped retaining ring 109 so as to be locked on the second output shaft 103.

Referring to FIGS. 3, 6, and 16, the wood lathe of this invention has the following advantages:

1. The rotational speed of the first and second workpieces 110, 120 can be adjusted with relative ease by simply rotating the rotary knob 832.

2. The speed adjustment of the first and second workpeices 110, 120 is stepless, thereby increasing the applicable range of the wood lathe.

3. The rotational speed of the first and second workpieces 110, 120 can be determined conveniently by referring to the indicator unit 90.

4. The second workpiece 120 can be locked on the second output shaft 103 for cutting. Accordingly, the workpieces 110, 120, which are suitable for finishing on the wood lathe of this invention, can be flat, elongate, annular, or in the form of a solid cylinder.

With this invention thus explained, it is apparent that numerous modifications and variations can be made without departing from the scope and spirit of this invention. It is therefore intended that this invention be limited only as indicated by the appended claims.

I claim:

1. A wood lathe comprising:

an elongated table having a first end and a second end;

a fixed seat unit including a first seat and a second seat that are fixed respectively on said first and second ends of said table;

a first driving device including
a rotating inner rod journalled between said first and second seats and having a first end that is disposed adjacent to and that projects outwardly from said first seat, and a second end that is disposed adjacent to said second seat,
a fixed outer tube disposed around said rotating inner rod and fixed between said first and second seats, and
a motor disposed on said second seat and connected to said second end of said rotating inner rod so as to rotate said rotating inner rod;

a first output shaft journalled on said first seat and parallel to said rotating inner rod, said first output shaft having a first end that is disposed over said first end of said rotating inner rod, and a second end that projects outwardly from said first seat and that is disposed between said first and second seats;

a second driving device including
a driving pulley unit disposed around said first end of said rotating inner rod and having a movable outer half that is sleeved movably on said rotating inner rod, a fixed inner half that is sleeved fixedly on said rotating inner rod and that is located between said movable outer half and said first seat, and a spring for biasing said movable outer half toward said fixed inner half,
a driven pulley unit disposed around said first end of said first output shaft and having a fixed outer half that is sleeved fixedly on said first output shaft, and a movable inner half that is sleeved movably on said first output shaft and that is located between said fixed outer half and said first seat, and
a V-belt unit trained on said driving and driven pulley units so as to transfer rotation of said rotating inner rod to said first output shaft;

a first workpiece-holding unit including
a first clamping element connected fixedly to said second end of said first output shaft,
a sliding member sleeved movably on said outer tube, and
a second clamping element mounted rotatably on said sliding member so as to be adapted to clamp a workpiece between said first and second clamping elements, thereby permitting rotation of the workpiece when said first output shaft rotates; and a speed-adjusting unit including:
  a fixed member disposed fixedly on said first seat,
  a push member disposed pivotally on said fixed member,
  a horizontal adjustment rod assembly journalled on said first seat and having a left-hand screw portion and a right-hand screw portion,
  a first driving element engaging threadably said left-hand screw portion of said adjustment rod assembly, and
  a second driving element engaging threadably said right-hand screw portion of said adjustment rod assembly such that said first and second driving elements move toward each other when said adjustment rod assembly rotates in a direction so as to rotate said push member in a direction, thereby moving said movable inner half of said driven pulley unit toward said fixed outer half of said driven pulley unit, said first and second driving elements moving away from each other when said adjustment rod assembly rotates in the opposite direction so as to rotate said push member in the opposite direction, thereby moving said movable inner half of said driven pulley unit away from said fixed outer half of said driven pulley unit, movement of said movable inner half of said driven pulley unit relative to said fixed outer half of said driven pulley unit resulting in change in position of said V-belt unit relative to said driving and driven pulley units, thereby varying rotational speed ratio of said first output shaft to said rotating inner rod.

2. The wood lathe as claimed in claim 1, wherein said adjustment rod assembly is formed with a fixed pinion portion, said wood lathe further comprising an indicator unit, which includes:

a rack connected vertically and movably to said first seat and meshing with said pinion portion of said adjustment rod assembly so as to move vertically relative to said first seat when said adjustment rod assembly rotates;
  a scale fixed relative to said first seat; and
  an indicator connected fixedly to said rack so as to move vertically relative to said scale when said adjustment rod assembly rotates.

3. The wood lathe as claimed in claim 1, further comprising a second workpiece-holding unit, which includes:

a bearing tube member disposed fixedly on said first seat;
  a second output shaft parallel to said first output shaft and having an externally threaded first end with a reduced outer diameter to define a shoulder, and a second end, said second output shaft being journalled within said bearing tube member and being adapted to extend through a second workpiece that is shaped as a ring plate;
  a driving gear sleeved fixedly on said first end of said first output shaft;
  a driven gear sleeved fixedly on said second end of said second output shaft;
  a toothed endless belt trained on said driving and driven gears so as to transfer rotation of said first output shaft to said second output shaft; and
  a nut engaging threadably said first end of said second output shaft so as to be adapted to lock the second workpiece between said nut and said shoulder of said second output shaft.

* * * * *